United States Patent [19]

Aidlin et al.

[11] E Patent Number: Re. 31,655

[45] Reissued Date of Patent: Aug. 28, 1984

[54] MACHINE AND METHOD FOR VERTICAL TRANSPORTATION OF CONTAINERS

[75] Inventors: Stephen H. Aidlin, West Hempstead; Michael Tartakowsky, Rego Park, both of N.Y.

[73] Assignee: Aidlin Automation Corp., Airgate, Fla.

[21] Appl. No.: 507,224

[22] Filed: Jun. 23, 1983

Related U.S. Patent Documents

Reissue of:

[64] Patent No.: 4,242,033
Issued: Dec. 30, 1980
Appl. No.: 25,891
Filed: Apr. 2, 1979

[51] Int. Cl.[3] ..... B65G 47/28; B65G 47/52

[52] U.S. Cl. ..... 414/662; 198/456; 198/474; 198/485; 414/592

[58] Field of Search ..... 198/420, 432, 433, 456, 198/458, 466, 467, 470, 474, 485, 563, 646, 465; 414/564, 568, 592, 662; 425/537

[56] References Cited

U.S. PATENT DOCUMENTS

| | | | |
|---|---|---|---|
| 3,724,637 | 4/1973 | Strauss et al. | 198/433 |
| 3,830,360 | 8/1974 | Graff et al. | 198/459 X |
| 3,863,751 | 2/1975 | Vignon | 198/489 X |
| 3,987,889 | 10/1976 | Godoy | 198/456 |
| 4,047,625 | 9/1977 | Grant | 198/485 X |
| 4,312,439 | 1/1982 | Young | 198/489 X |
| 4,343,587 | 8/1982 | Aidlin et al. | 198/488 X |

FOREIGN PATENT DOCUMENTS

| | | |
|---|---|---|
| 51-4762 | 6/1974 | Japan . |
| 51-31848 | of 1978 | Japan . |
| 53-57672 | of 1978 | Japan . |

OTHER PUBLICATIONS

Publication "A Method for Separating and Transporting an Article to a Higher Chute", Sect. 71, p. 53 of Collection of Illustration of Automated Handling in Books of Automation, (1) Yozo Morimura (author) publ. by Taiga Shuppan Inc., Tokyo, Apr. 1, 1976, Japan.

*Primary Examiner*—Jeffrey V. Nase
*Attorney, Agent, or Firm*—Erwin S. Teltscher

[57] ABSTRACT

A machine for cyclically receiving a plurality of containers from an unloading station and for transporting them to a discharge station, which is spaced apart from, and above the unloading station by a predetermined distance, includes a platform operable in a first position thereof below the loading station and near the discharge station for accepting the containers, and which is movable thereafter to a second position spaced substantially vertically above the first position for unloading the containers to the discharge station; the platform is thereafter returned to the first position. A control device is connected to the platform for controlling the operation thereof, and a drive arrangement is provided for moving the platform from the first position to the second position and vice versa.

15 Claims, 6 Drawing Figures

MACHINE AND METHOD FOR VERTICAL TRANSPORTATION OF CONTAINERS

Matter enclosed in heavy brackets [ ] appears in the original patent but forms no part of this reissue specification; matter printed in italics indicates the additions made by reissue.

CROSS-REFERENCE TO OTHER APPLICATIONS

Reference should be had to [copending application Ser. No. 009,597,] *U.S. Pat. No. 4,343,587* by the same inventors, filed on Feb. 5, 1979, and entitled: "Machine and Method for Transporting Containers", as well as to U.S. Pat. No. 4,132,584 entitled: "Machine for Manufacturing Flat-bottomed Bottles", issued to Samuel S. Aidlin and Stephen H. Aidlin, the latter being a co-inventor of the present application.

BACKGROUND OF THE INVENTION

Machines of the type described are utilized to transport containers from an unloading station to a discharge station, such as a conveyor belt, for further processing the containers. The containers may, for example, by manufactured in a specific manner in a first apparatus or machine, and may then be required to be further processed in a second machine. The unloading arrangements of the first machine do not necessarily, however, match the loading requirements of the second machine.

A machine of this type is disclosed, for example, in the referenced [copending application Ser. No. 009,597] *U.S. Pat. No. 4,343,587.* Containers are transported, as described in the aforesaid referenced [application] *U.S. Pat. No. 4,343,587* , from an unloading station to a discharge region of the machine by way of a horizontal conveyor. In that particular arrangement it is, however, necessary to employ four distinct positions of the platform to achieve the required transport objectives for the containers, and the platform of the machine must further be reciprocally pivotable about a predetermined axis.

The present invention achieves similar objectives in a different and simpler way, by employing a vertical transporter, which requires only two distinct positions, rather than the four positions disclosed in the above-referenced earlier application. Neither is it necessary to pivot the platform in the present invention, as is the case in the earlier invention.

SUMMARY OF THE INVENTION

It is accordingly one of the objects of the present invention to create a container-transporting or conveying device of the above type which is capable of operating at a required production speed of handling one half a dozen bottles in 20 seconds, or 18 bottles a minute by employing only two end positions of a platform movable along a vertical direction. This object is attained, according to the present invention, by providing a machine including a frame, for cyclically receiving a plurality of containers from an unloading station and for transporting them to a discharge station, the discharge station being spaced apart from, and above the unloading station by a predetermined distance. The machine includes a platform connected to the frame, which platform is operable in a first position thereof below the unloading station for accepting the containers, and is movable thereafter to a second position spaced substantially vertically above the first position for unloading the containers to the discharge station, and is movable thereafter to return to the first position. Control means are connected to the platform for controlling the operation thereof, and drive means are provided for moving the platform from the first position to the second position, and vice versa.

It is advantageous if the platform of the machine includes a plurality of walls substantially forming individual compartments for storing the containers therein, and if the compartments are spaced from one another at respective first distances at the first position, and at respective second distances at the second position, and if the drive means are arranged for automatically changing the first distances to the second distances, and vice versa.

It is preferable if the containers are substantially spaced equidistantly from one another at the first and second positions, respectively, and if guide means are provided for moving the platform from the first position, to the second position, and vice versa.

The compartments are preferably disposed in a row, and the driving means preferably include joining means for linking respective adjacent compartments for limiting relative motion of one compartment with respect to an adjacent compartment, and the reciprocally actuable driver means are preferably connected to an end compartment of the row of compartments, so that a stroke in one direction of the driver means pushes the compartments towards one another, so as to occupy the first respective distances, and a stroke in a direction opposite to the one direction pulls the compartments away from one another, so as to occupy the second respective distances.

It is advantageous if the containers are received by the platform from the loading station, so as to be disposed at a predetermined acute angle with the horizontal, and if guard means are provided for restraining each container from [impacting on] *tumbling against* a vertically disposed wall of the machine *and impacting thereon wih a longitudinal side thereof.*

It is further advantageous if release means are provided for feeding the containers to the unloading station upon the containers having reached the second position.

It is advantageous if the release means includes the vertical wall, which wall has a predetermined height and normally separates the containers loaded into the platform from the discharge station, so that, upon the containers being moved by the platform to a prearranged height above the predetermined height of the wall, the containers are allowed to slide from their normally occupied position onto the discharge station.

The control means preferably includes a first switch disposed near the second position and actuatable by the platform upon reaching the second position for triggering a return motion of the platform to the first position.

It is preferable if the second distances exceed the first distances, and if the control means further include a second switch disposed near the first position, and actuatable by the platform upon the platform reaching the first position for triggering the driver means to push the compartments towards one another.

The drive means advantageously include pneumatically operable means, and the unloading station preferably includes a chute, the platform being adapted to receive the containers from the chute in the first position.

It is advantageous if detecting means are connected to the platform for sensing when a prearranged number of the containers has been loaded thereinto, and for thereafter commanding the drive means to move the platform from the first position to the second position.

The platform preferably includes two sides opposite one another, a loading area being defined within the two sides, and it is advantageous if the detecting means include a light source disposed external to the loading area near one of the sides for emitting a light beam, a reflector disposed near the other of the sides for reflecting the light beam towards the light source, and a photoelectric detector disposed near the light source for sensing the presence of the reflected light beam, in the absence of the containers, so that the absence of the reflected light beam triggers the drive means to initiate the motion of the platform from the first position to the second position.

A method of cyclically transporting a predetermined number of containers from an unloading station by a platform to a discharge station, preferably includes the steps of:

unloading the containers from the unloading station to the platform, moving the loaded platform from a first position below the unloading station to a second position spaced substantially vertically above the first position, and near the discharge station, discharging the containers at the discharge station, thereafter returning the empty platform from the second position to the first position, and thereafter cyclically repeating all aforesaid steps until the predetermined number of containers has been transported from the unloading station to the discharge station.

It is further advantageous if the platform includes individual compartments for storing the containers therein, the compartments being spaced from one another at respective first distances at the first position, and at respective second distances at the second position, and if the moving step includes the step of changing the first distances to the second distances, and if the returning step includes the step of changing the second distances to the first distances.

It is further advantageous if the unloading step includes the step of photoelectrically determining the presence of at least one of the containers in the platform for triggering the moving step, and if the discharging step includes discharging the containers by gravity from the platform to the discharge station.

BRIEF DESCRIPTION OF THE DRAWING

The invention will be better understood with reference to the accompanying drawing, in which.

DESCRIPTION OF THE PREFERRED EMBODIMENT

Figure 2:
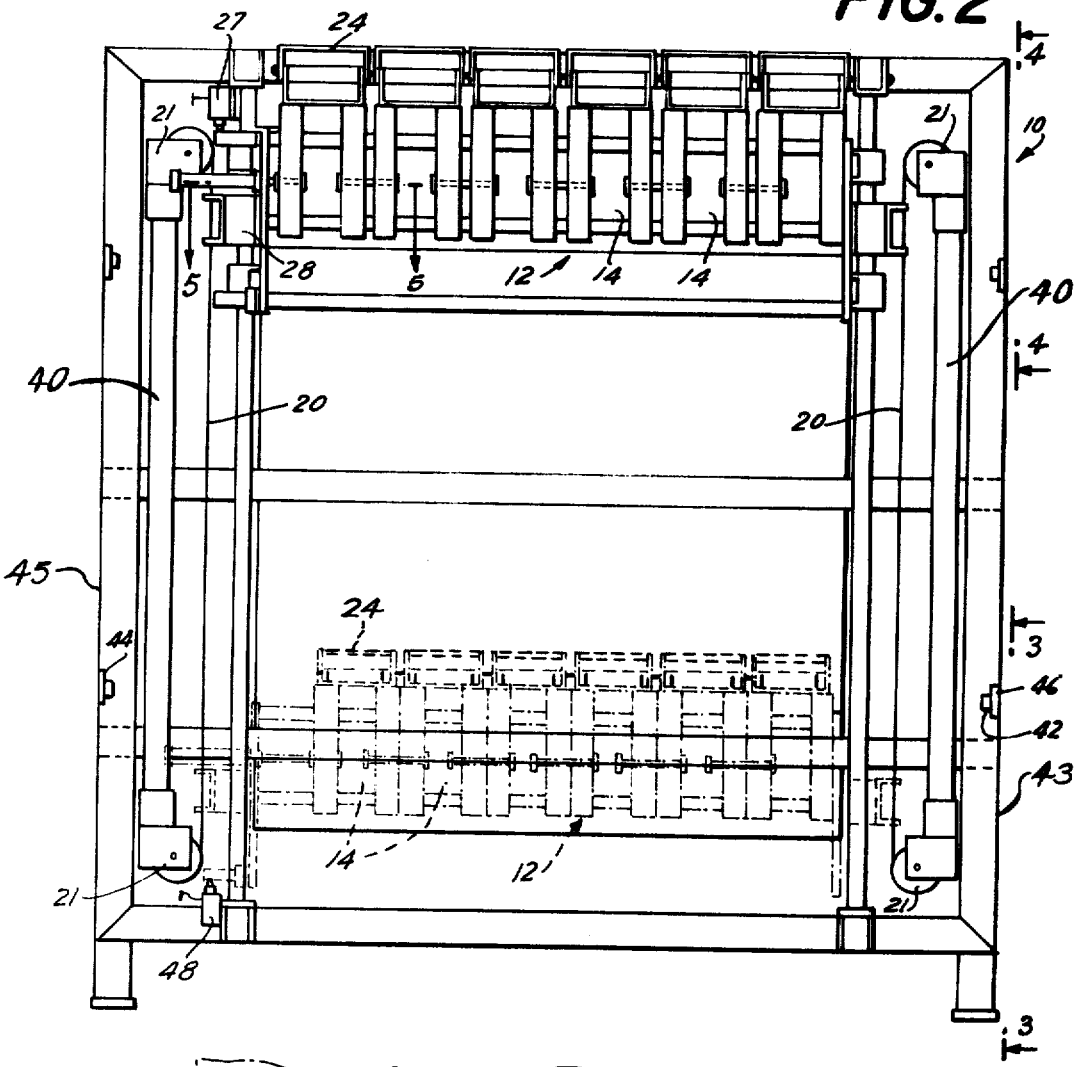
FIG. 2 is an elevational view of the machine, according to the present invention, when viewed along the line 2—2 in FIG. 1.
Figure 1:
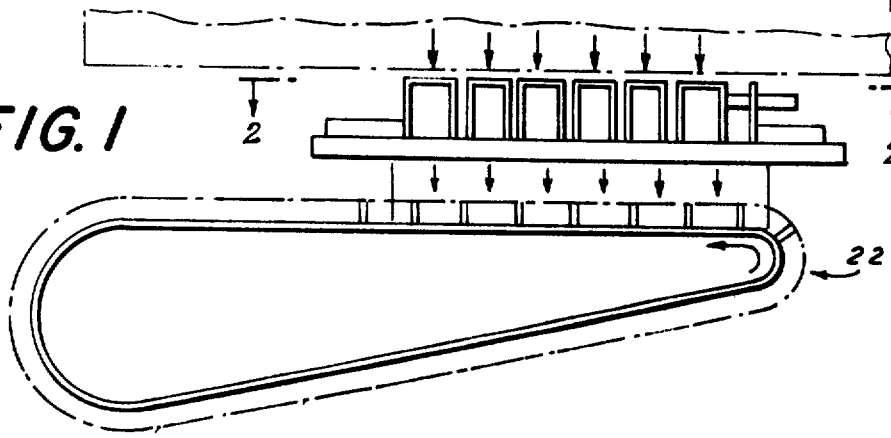
FIG. 1 shows a top plan view of the machine of the present invention, adjacent a discharge station.
Figure 3:
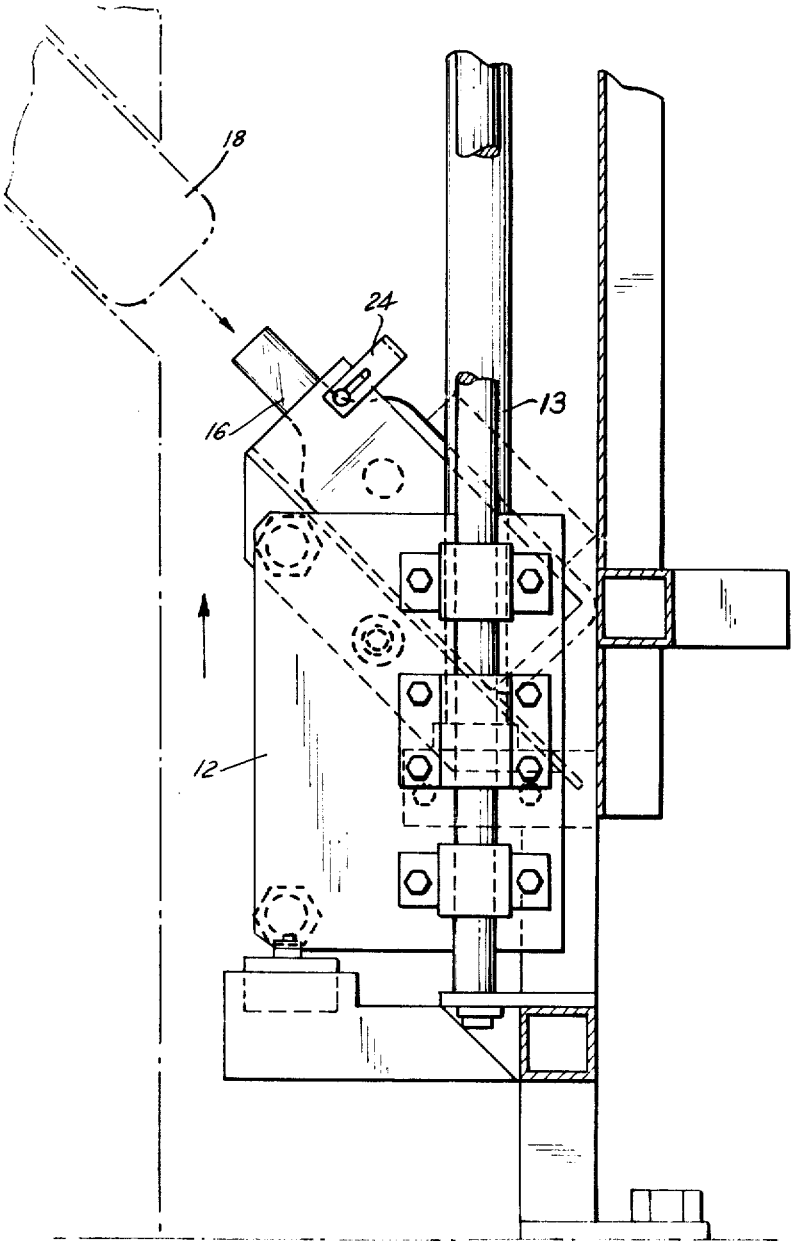
FIG. 3 is a sideview of a portion of the machine, when the platform occupies a first, or lower position, as viewed along the line 3—3 of FIG. 2.
Figures 4, 7:
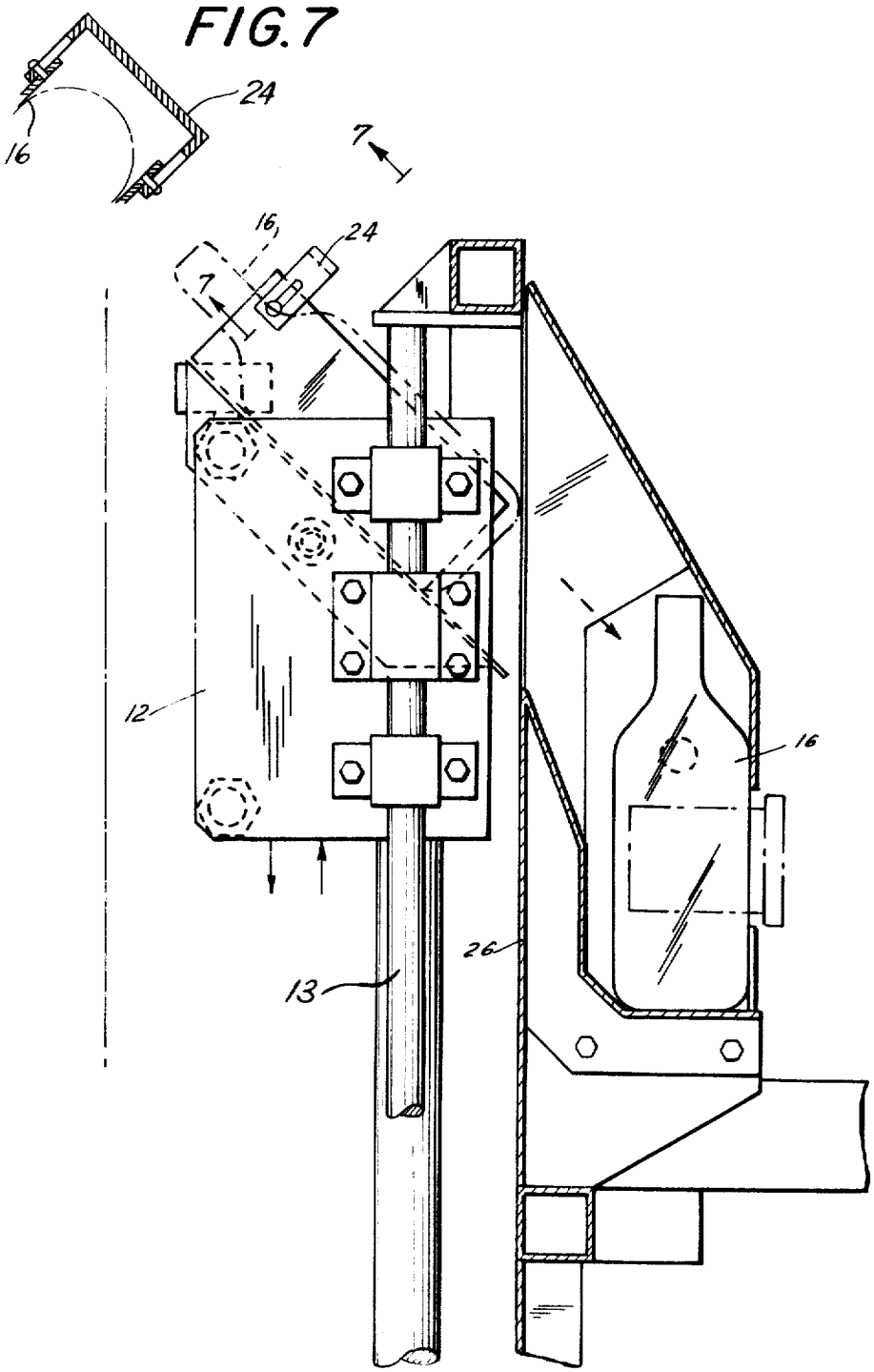
FIG. 4 is a side view of a portion of the machine, when the platform occupies a second, or upper, position, as viewed along line 4—4 of FIG. 2.
FIG. 7 is a cross-section along line 7—7 of FIG. 4.

Referring now to the drawing, there will be seen a frame of the machine 10, to which there is connected a platform 12, which includes a plurality of walls substantially forming individual compartments 14 for receiving containers 16 from an unloading station in the form of a chute 18. The platform 12 is arranged to travel along guide means, such as vertical bars 13, best seen in FIGS. 3 and 4, from a first position below the unloading station, which is in the form, for example, of a chute 18, in which first position the platform 12 normally receives a plurality of containers 16, to a second position above a discharge station 22, by means of an endless cord 20, passing over pulleys 21. The discharge station 22, may, for example, be a machine for manufacturing flat-bottomed bottles, as disclosed in referenced U.S. Pat. No. 4,132,584. The containers 16 are normally received by the platform 12 so that the longitudinal axis of a container 16 forms an acute angle with the horizontal, a guard 24 preventing the containers 16 from tumbling against a vertical wall 26, and impacting thereon with a longitudinal side thereof, as best seen in FIG. 3. As the containers 16 travel from the first position upwardly to the second position, the vertical wall 26, having a predetermined height, separates the platform 12, and the containers 16 loaded therein, from the discharge station 22. When the platform 12, and therefore the containers 16 reach a level above that predetermined height, the containers 16 slide freely onto the discharge station 22 disposed therebelow *and assume an upright position in the discharge station 22*. The platform 12 is arranged to shortly thereafter make contact with a switch 27 secured to the frame 10, which triggers the return motion of the platform 12 to its first position. The drive means for cyclically moving the platform 12 from the first position to the second position and vice versa are preferably well known pneumatic drive means in the form of, for example, a pneumatic or air cylinder 40. The machine will normally accomodate 6 compartments, although additional compartments can be arranged on the machine, if necessary.

Figure 6:
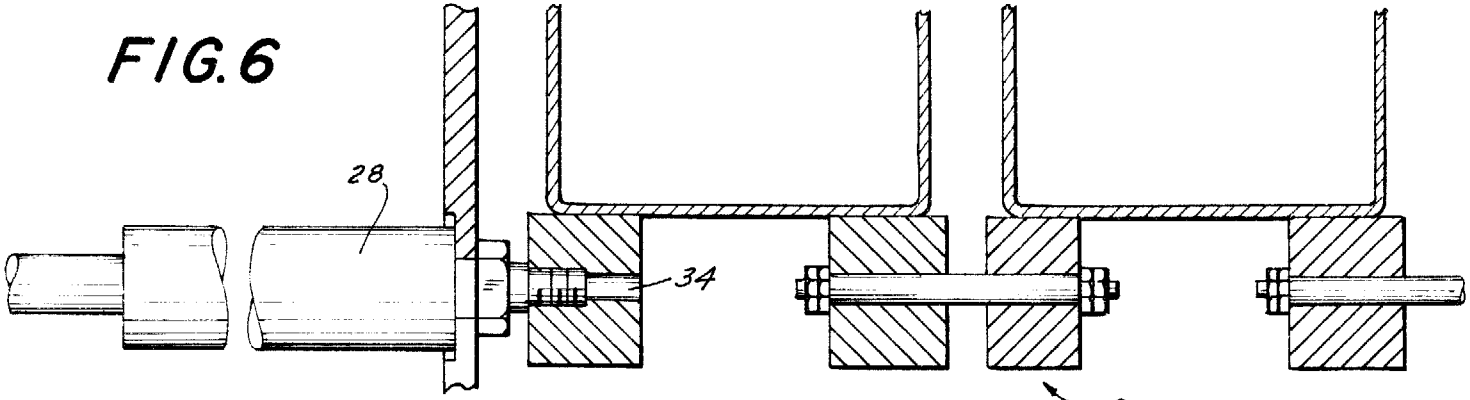
FIG. 6 is a plan view of a detail of the arrangement of the compartments, when in the second, or upper, position
Figure 5:
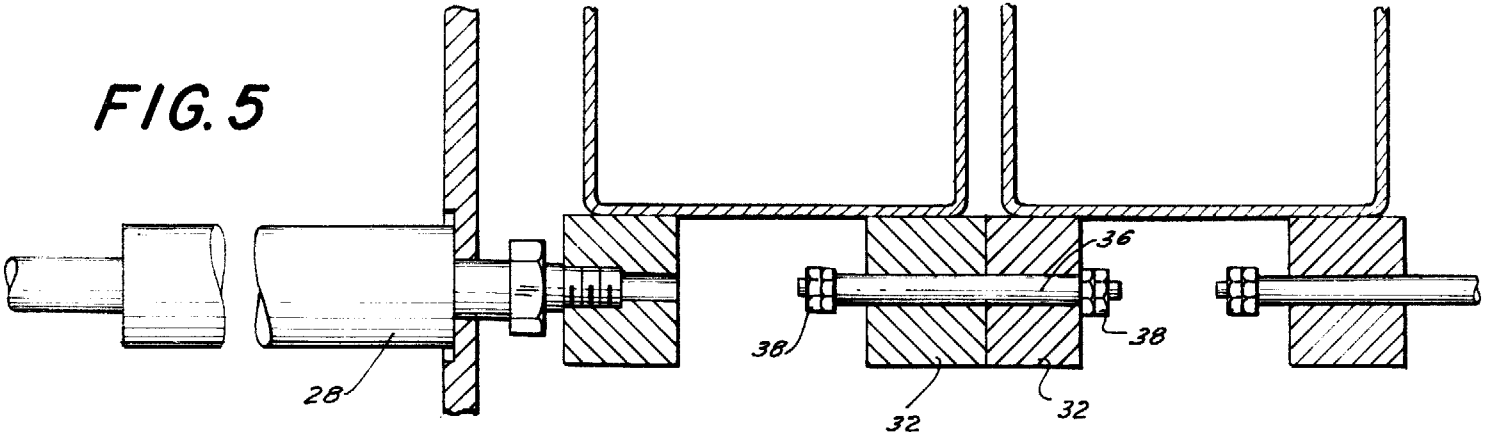
FIG. 5 is a plan view of a detail of the arrangement of the compartments when in the first, or lower, position.

The unloading station 18 will not necessarily be matched to the discharge station 22, as far as spacing of the compartments 14 is concerned; for this reason it is advantageous to provide a mechanism which automatically matches the spacing of the containers 16 unloaded from the unloading station 18 to the spacing of the containers discharged at the discharge station 22. For example, in one particular implementation, the spacing between adjacent containers 16 in the unloading station 18 is 5½", while the spacing between adjacent containers 16 in the discharge station 22 is 6". To accomodate such diversity of spacings, the mechanism of the present invention provides for the compartments 14 to be spaced along a row, and slidably linked by respective links 30. Each link 30 consists, for example, of a pair of blocks 32, each block 32 being secured to respective adjacent containers 14, and having formed therein a bore 34, a bolt 36 passing through bores 34 of the pair of blocks 32. The bolt 36 is secured with only one end thereof to one of the blocks 32, but passes freely through the other block 32, while being restrained from altogether becoming separated from that other block 32 by restraining means, such as a nut 38, so that two adjacent containers 16 can be spaced from one another, in the limit, by first and second distances, respectively, the second distance exceeding the first distance. The occurrance of these distances is arranged, for example, so that the compartments 14 are spaced from one another by the first distances, respectively, in their first or lower position, and by the second distances, in their second or upper position. Driver means, in the form, for example, of a pneumatic cylinder 28, secured to an end compartment 14, are arranged to cyclically pull the compartments 14 apart, and pull them together again, as best seen in FIGS. 5 and 6.

The timing of the upward and downward motion of the platform 12 is accomplished by control means, which include a light source 42 arranged on one side 43 of the row of compartments 14 and external to the platform 12, for beaming a light beam to a reflector 44 arranged on the other side 45 of the row of compartments 14, which reflector 44, in turn is arranged to reflect the light beam to a photodetector 46 disposed in proximity to the light source 42, the photodetector 46 being arranged to receive the reflected light beam. In the absence of any containers 16 in the compartments 14, the photodetector 46 receives the unobstructed light beam reflected from the reflector 44, and provides an output signal; as soon as one or several containers 16 are loaded into respective compartments 14, the light beam is interrupted, and the photodetector 46 fails to provide an output signal. In the absence of such an output signal, the upward motion of the platform 12 is initiated. The control means further includes the switch 27 disposed on the frame 10 in the vicinity of the second, or upper position of the platform 12, which control switch 27 is arranged to trigger the return, or downward motion of the platform 12, when the platform 12 contacts the switch 27. When the platform 12 returns to its first position on its downward motion from the second position, it is arranged to make contact with a switch 48, which commands the control means to trigger in turn a stroke of the cylinder 28 in a direction so as to push the compartments 14 towards one another, which compartments 14 then reassume their initial position.

The switches 27 and 48 thus additionally trigger the spreading apart and pushing towards another motions of the compartments 14, which motions are accomplished by the pneumatic cylinder 28.

It will be further apparent that numerous variations and modifications may be made in the apparatus of the present invention, by any one skilled in the art, in accordance with the principles of the invention hereinabove set forth, and without the exercise of any inventive ingenuity.

What is claimed is:

1. A machine including a frame formed with a substantially vertically disposed wall, for cyclically receiving a plurality of containers from an unloading station, each container having a longitudinal axis, and for transporting them to a discharge station, said discharge station being spaced apart from, and above said unloading station by a predetermined distance, comprising in combination:

a platform connected to said frame, being operable in a first position thereof below said unloading station for accepting said containers, so that the longitudinal axis of each container subtends *in an initial position thereof at least* a predetermined *acute* angle with the horizontal, said platform being movable thereafter to a second position spaced substantially vertically above said first position for unloading said containers to said discharge station, said platform being movable thereafter to return *from said second position* to said first position, guard means for restraining each of said containers from tumbling against said wall and impacting thereon *with a longitudinal side thereof* when being received by said platform, *said wall and said guard means thereafter maintaining each container in said initial position during an initial movement of said platform from said first position to said second position,* control means connected to said platform for controlling the operation thereof, and drive means for moving said platform [from said first position to said second position and vice versa] *between said first and second positions, and wherein said substantially vertically disposed wall has a predetermined height normally separating the containers loaded into said platform from said discharge station, whereby upon said containers being moved by said platform to a prearranged height above said predetermined height, said containers are allowed to slide from their normally occupied position onto said discharge station.*

2. A machine according to claim 1, wherein said platform includes a plurality of walls substantially forming individual compartments for storing said containers therein, said compartments being spaced from one another at respective first distances at said first position, and at respective second distances at said second position, and further comprising driver means arranged for automatically changing said first distances to said second distances, and vice versa.

3. A machine according to claim 2, wherein said containers are substantially spaced equidistantly from one another at said first and second positions, respectively, and further comprising guide means for moving said platform from said first to said second position, and vice versa.

4. A machine according to claim 2, wherein said compartments are disposed in a row, and wherein said driver means comprises joining means for linking respective adjacent compartments for limiting relative motion of one compartment with respect to an adjacent compartment, and reciprocally actuable means connected to an end compartment of said row of compartments, whereby a stroke in one direction of said driver means pushes said compartments towards one another so as to occupy said first respective distances, and a stroke in a direction opposite to said one direction pulls said compartments away from one another so as to occupy said second respective distances.

5. A machine according to claim 4, wherein each of said second distances exceeds each of said first distances, and wherein said control means further comprises a second switch disposed near said first position, and actuatable by said platform upon said platform reaching said first position for triggering said driver means to push said compartments towards one another.

6. A machine according to claim 1, further comprising sliding means for feeding said containers to said discharge station upon said containers having reached said second position.

7. A machine according to claim 6, wherein said substantially vertically disposed wall [said wall having] *has* a predetermined height normally separating the containers loaded into said platform from said discharge station, whereby, upon said containers being moved by said platform to a prearranged height above said predetermined height, said containers are allowed to slide from their normally occupied position onto said discharge station.

8. A machine according to claim 1, wherein said control means includes a first switch disposed near said second position and actuatable by said platform upon reaching said second position for triggering a return motion of said platform to said first position.

9. A machine according to claim 1, wherein said drive means includes pneumatically operable means, wherein said unloading station includes a chute, and said platform is adapted to receive said containers from said chute in said first position.

10. A machine according to claim 1, wherein said control means further comprise detecting means connected to said platform for sensing when at least one of said containers has been loaded thereinto, and for thereafter commanding said drive means to move said platform from said first position to said second position.

11. A machine according to claim 10, wherein said platform includes two sides opposite one another, a loading area being defined within said two sides, and wherein said detecting means includes a light source disposed external to said loading area near one of said sides for emitting a light beam, a reflector disposed near the other of said sides for reflecting said light beam towards said light source, and a photoelectric detector disposed near said light source for sensing the presence of the reflected light beam, in the absence of said containers, whereby the absence of the reflected light beam triggers said drive means to initiate the motion of said platform from said first position to said second position.

12. In a method of cyclically receiving a plurality of containers from an unloading station by a machine including a frame formed with a substantially vertically disposed wall, and a platform, and for transporting the containers to a discharge station, *each container defining a longitudinal axis,* the steps comprising:

(a) unloading the containers from the unloading station to the platform *so that the longitudinal axis of each container subtends in an initial position thereof at least a predetermined acute angle with the horizontal,*

(b) restraining each of said containers from tumbling against said wall and impacting thereon *with a longitudinal side thereof* when being received by said platform, (c) moving the loaded platform *substantially along said vertically disposed wall* from a first position below the unloading station to a second position spaced substantially vertically above said first position, and near said discharge station, (d) discharging the containers at the discharge station, (e) thereafter returning the empty platform from the second position to the first position, and (f) thereafter cyclically repeating steps (a) through (e) until a desired number of said containers has been transported from the unloading station to the discharge station.

13. A method according to claim 12, wherein the platform includes individual compartments for storing the containers therein, the compartments being spaced from one another at respective first distances at the first position, and at respective second distances at said second position, and wherein step (c) includes the step of changing said first distances to said second distances, and wherein step (e) includes the step of changing said second distances to said first distances.

14. A method according to claim 12, wherein step (a) includes the step of photoelectrically determining the presnce of at least one of said containers in said platform for triggering step (c), and wherein step (d) includes discharging the containers by gravity from the platform to the discharge station.

*15. A machine according to claim 1, wherein said container, following the initial position thereof, is constrained to assume an upright position upon sliding into said discharge station.*

* * * * *